United States Patent [19]

Myers et al.

[11] 4,121,421
[45] Oct. 24, 1978

[54] HYDRAULIC BRAKE BOOSTER HAVING CHARGING AND CHECK VALVES

[75] Inventors: Bruce B. Myers; Robert W. Jackson, both of South Bend, Ind.

[73] Assignee: The Bendix Corporation, Southfield, Mich.

[21] Appl. No.: 757,263

[22] Filed: Jan. 6, 1977

[51] Int. Cl.² ............................................. B60T 17/18
[52] U.S. Cl. .................................................. 60/582
[58] Field of Search ................................. 60/548, 582; 251/DIG. 1; 91/6, 412; 137/493.1

[56] References Cited
U.S. PATENT DOCUMENTS

| 3,638,528 | 2/1972 | Lewis | 60/548 |
| 3,889,467 | 6/1975 | Huffman | 60/548 |
| 3,955,597 | 5/1976 | Oneyama | 251/DIG. 1 |

FOREIGN PATENT DOCUMENTS 2,507,588  8/1975  Fed. Rep. of Germany ............. 60/582

Primary Examiner—Martin P. Schwadron
Assistant Examiner—Abraham Hershkovitz
Attorney, Agent, or Firm—Paul David Schoenle; Ken C. Decker

[57] ABSTRACT

A hydraulic brake booster includes a housing defining a pressure chamber and an inlet port communicating pressurized fluid to an accumulator and the pressure chamber. The housing includes a bore which slidably receives a charging valve and sealingly receives a check valve. The charging valve sealingly engages the housing bore via a sealing ring in one position and is pressure responsive to move toward a second position abutting the check valve to open communication between the inlet port and the accumulator. A stem is slidably carried in a passage in the check valve and the stem is received in a slot in the charging valve. An operator actuator is engageable with the stem to unseat one end of the stem from the check valve so that pressurized fluid from the accumulator is communicated to the pressure chamber. Moreover, the slot on the charging valve permits communication between the inlet port and the pressure chamber when the accumulator pressure is below the pressure at the inlet port and the operator actuator is unseating the stem from the check valve. In addition, the charging valve and housing bore include substantially parallel tapered surfaces that oppose frusto conical surfaces on the sealing ring that are substantially parallel to the tapered surfaces and between the housing bore and charging valve to seal the accumulator from the inlet port when the sealing ring is engaging the housing bore and the charging valve.

1 Claim, 3 Drawing Figures

HYDRAULIC BRAKE BOOSTER HAVING CHARGING AND CHECK VALVES

BACKGROUND OF THE INVENTION

In a hydraulic brake booster pressurized fluid from an inlet port is communicated to an accumulator. The pressurized fluid is also communicated upon operator actuation of a spool valve to a pressure chamber wherein the pressurized fluid urges a piston to move within the hydraulic brake booster housing to effect a brake application.

When the actuation of the spool valve fails to communicate pressurized fluid to the pressure chamber, further brake pedal application by a motor vehicle operator urges a lever into engagement with a check valve to open communication between the accumulator and pressure chamber. Consequently, pressurized fluid is communicated to the pressure chamber to effect a brake application.

In order to charge the accumulator and to communicate the accumulator with the pressure chamber, the hydraulic brake booster housing includes a bore extending from the inlet port to the pressure chamber and intersecting the accumulator. Within this bore are disposed a charging valve and a check valve. The charging valve of the prior art communicates pressurized fluid from the inlet port to the accumulator when the force of the pressure at the inlet port is greater than the force of the pressure within the accumulator plus the resilient force of a spring urging the charging valve to a closed position. The check valve of the prior art normally closes communication between the accumulator and the pressure chamber as a result of the force of the pressure within the accumulator and the resilient force of the spring urging the check valve to a closed position.

SUMMARY OF THE INVENTION

The present invention is an improvement in the hydraulic brake booster charging and check valves of the prior art. In particular, the charging valve is slidably mounted in a hydraulic brake booster housing bore that extends from the inlet port to the pressure chamber and intersects the accumulator. The check valve is fixedly disposed within the housing bore to limit the axial movement of the charging valve from a transverse face on the housing bore to the check valve. Moreover, the check valve includes a stem that is slidably mounted in a passage extending through the check valve. The stem is pressure responsive such that a ball at one end closes the passage and an operator actuating means is engageable with the other end to open the check valve passage. In order to compactly arrange the charging and relief valves, the charging valve includes a slot for receiving the stem.

In addition, the housing bore includes a tapered shoulder that is substantially parallel with a tapered edge on the charging valve and the edge and shoulder engage a sealing ring having frusto conical surfaces substantially parallel with the tapered shoulder and edge to seal the charging valve to the housing bore.

The check valve comprises a metal sleeve that is sealingly engaged with the housing bore and a plastic insert that is sealingly engaged with the sleeve. The insert forms the passage within which the stem is slidably mounted and the sleeve forms an abutment for engaging the charging valve to limit the axial travel of the charging valve in one direction. The charging valve comprises a plastic shell forming a radial clearance with the housing bore so that movement of the shell away from either the sealing ring or the tapered shoulder permits fluid flow through the housing bore around the shell.

It is an important object of this invention to provide a simple and economical construction for a charging valve and a check valve for use in a hydraulic brake booster.

It is another object of this invention to provide an improved sealing construction for the charging valve.

DETAILED DESCRIPTION

Figure 1:
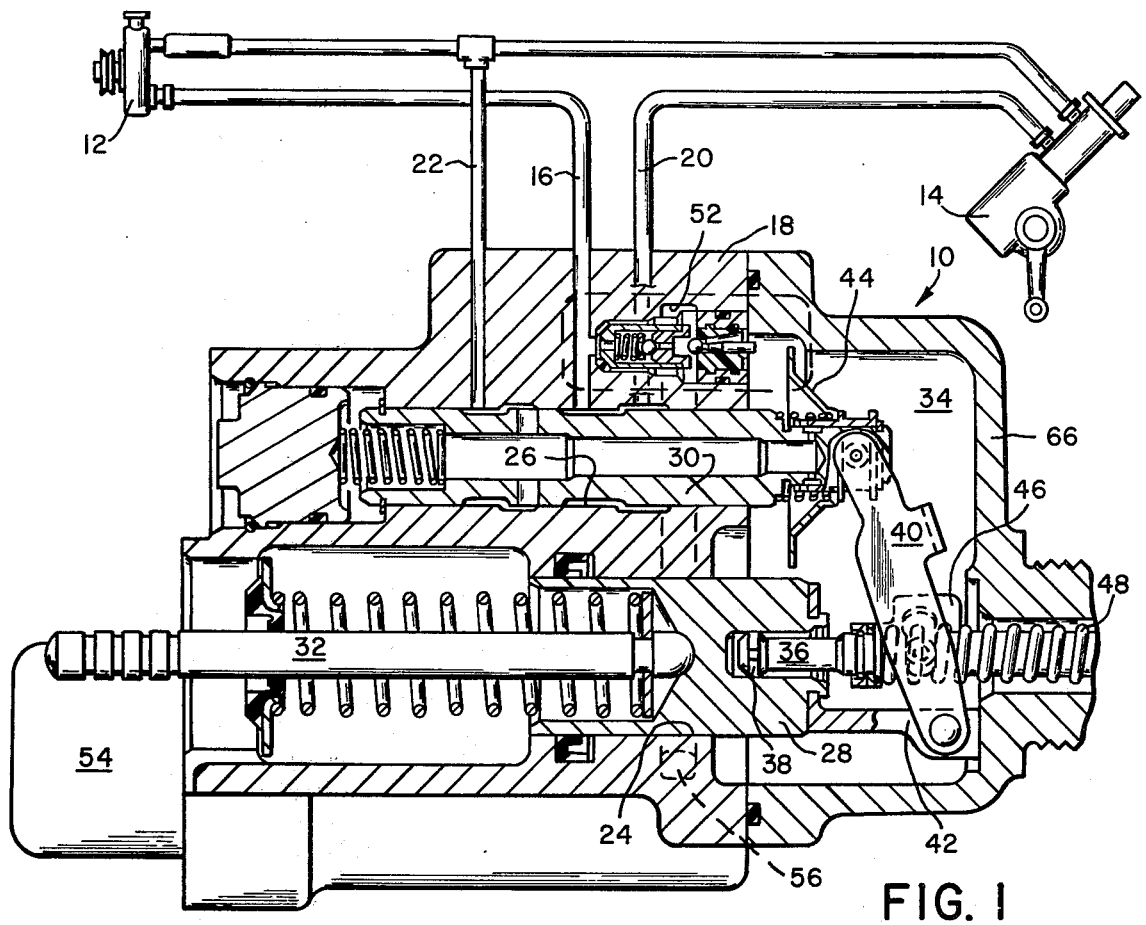
FIG. 1 is a schematic view of a hydraulic brake booster system showing the booster partly in cross section.

A hydraulic brake booster is illustrated in general in FIG. 1 by the numeral 10. The booster is connected via suitable conduit means to a pump 12 and a steering gear 14. An inlet port 16 communicates pressurized fluid from the pump 12 to the booster housing 18 while an outlet port 20 communicates pressurized fluid from the booster housing 18 to the steering gear 14 and a return port 22 communicates pressurized fluid back to the pump 12.

The hydraulic brake booster housing 16 includes a pair of bores 24 and 26 for slidably receiving a piston 28 and a spool valve 30, respectively. The piston 28 is connected to a rod 32 which extends from the booster housing 18 to operatively engage a master cylinder (not shown) on the left of the housing. The bore 26 intersects the inlet port 16, the outlet port 20 and the return port 22 and the spool valve 30 cooperates with these ports to communicate the inlet port 16 with the outlet port 20 when the spool valve 30 is in one position and to communicate the inlet port 16 with a pressure chamber 34 when the spool valve is moved to a second position, as is well known in the art.

A rod 36 extends from a blind bore 38 in the piston 28 and is operatively connected to a brake pedal (not shown). A lever 40 is pivotally connected to a bracket 42, which is attached to the piston 28, to the spool valve 30 via a flange 44, and to a collar 46 which is slidingly carried on the rod 36 and biased to the left via spring 48.

Figure 2:
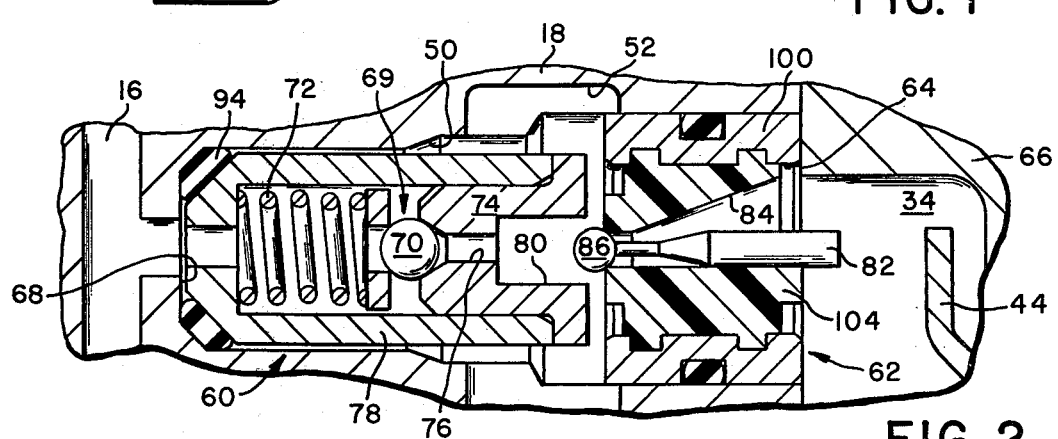
FIG. 2 is an enlarged view of the encircled portion of FIG. 1.

Turning to FIG. 2, the hydraulic brake booster housing 18 includes a stepped bore 50 that extends from the inlet port 16 to the pressure chamber 34 and intersects an accumulator path 52 which communicates with an accumulator 54, illustrated in FIG. 1, via a port 56 opening to the accumulator 54. In accordance with the invention a charging valve 60 and a check valve 62 are disposed within the stepped bore 50. The check valve 62 is held within the stepped bore 50 by means of the overlap at 64 provided by the housing cover 66, which overlap abuts the check valve to maintain the same within the stepped bore 50. In contrast thereto, the charging valve 60 is slidably mounted in the stepped bore 50 between a transverse face 68 on the stepped bore and the check valve 62.

The charging valve 60 carries a relief valve 69 in the form of a ball 70 which is biased by spring 72 against the plug 74 to close the plug opening 76. The plug is press fitted or secured by other suitable means to the cylindrical shell 78 of the charging valve 60. A slot 80 on the plug 74 communicates with an opening 76 and another opening 77 communicates the inlet port to the interior of the shell 78.

A stem 82 is slidably carried in the passage 84 which extends through the check valve 62. A ball 86 on one end of the stem 82 is engageable with the check valve to close the passage 84. The ball 86 and the stem 82 extend into the slot 80 on the charging valve 60 so that the charging valve 60 can abut the check valve 62 without interfering with the opening of passage 84 when the stem 82 and ball 86 move to the left viewing FIG. 3.

For the purpose of sealing the charging valve 60 to the housing bore 50 there is provided a tapered shoulder 90 on the transverse face 68 and a tapered edge 92 on the shell 78, which tapered edge 92 is substantially parallel to the tapered shoulder 90. Moreover, a sealing ring 94 is disposed between the tapered shoulder 90 and the tapered edge 92 and the sealing ring 94 includes a frusto conical inner surface 96 and a frusto conical outer surface 98 that are substantially parallel to the shoulder and edge.

The check valve 62 comprises a sleeve 100 with another recess carrying a sealing ring 102 and inner recesses for receiving a portion of an insert 104 to sealingly fix the insert 104 to the sleeve.

In the preferred embodiment of the invention the shell 78, the plug 74 and the insert 104 are formed from a thermoplastic material such as nylon so that these parts can be injection molded. In particular, the plastic insert 104 is injection molded into the "mold" formed by the sleeve 100 which can be made of a harder material such as aluminum. It is seen in FIG. 2 that the plug 74 abuts the sleeve 100 as well as the insert 104 when the charging valve 60 moves to the right. Therefore, the abutment between the plug 74 and the sleeve 100 prevents the plug from disforming the plastic insert 104 when in abutment therewith.

MODE OF OPERATION

The hydraulic brake booster 10 operates in a conventional manner to provide a power assist to a brake application. For example, when the vehicle operator steps on the brake pedal the rod 36 is urged to the left to pivot the operator actuator 40 about the pivot on bracket 42. Consequently, the pivotal connection with flange 44 moves the spool valve 30 to the left to communicate pressurized fluid from the pump 12 to the pressure chamber 34 via inlet port 16 and the passage through spool valve 30. The increase in pressure in chamber 34 urges the piston to the left to operatively engage the rod 32 with the brake master cylinder to effectuate a brake application.

If the pressure in the pressure chamber is insufficient to urge the piston 28 to the left, further pedal movement pivots the operator actuator 40 about the pivotal connection with bracket 42 to bring the flange 44 into engagement with the stem 82 to move the stem ball 86 away from the passage 84. Consequently, stored pressure within the accumulator 54 and the accumulator passage 52 is communicated to the pressure chamber 34 to assist braking.

If the accumulator 54 and the spool valve 30 do not communicate enough pressurized fluid to assist braking, the operator actuator 40 pivots about the connection with flange 44 to urge the bracket 42 and piston 28 to the left to effectuate a manual brake application.

With the charging valve 60 and the check valve 62 of the present invention, the accumulator 54 is charged with pressurized fluid from the inlet port whenever the pressure in the inlet port is greater than the pressure in the accumulator 54 or passage 52. At such time the larger pressure on the left of charging valve 60 urges the shell 78 and plug 74 to the right, viewing the Figures, away from the sealing ring 94 until the plug 74 abuts the sleeve 100 and insert 104. Consequently, pressurized fluid is communicated through the radial clearance between the shell 78 and the housing bore 50 to the passage 52 and the accumulator 54. When the pressure in the accumulator 54 exceeds the inlet port pressure the discharge valve 60 is urged to the left until the tapered edge 92 on the shell 78 engages the inner frusto conical surface 96 of the sealing ring 94 and the outer frusto conical surface 98 engages the tapered shoulder 90 to close the accumulator to the inlet port.

Figure 3:
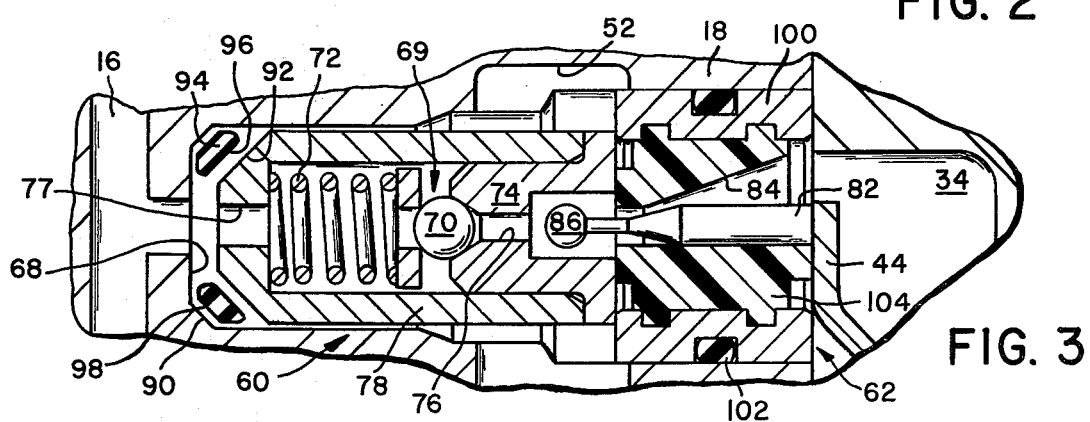
FIG. 3 is a view similar to FIG. 2 with the charging valve abutting the check valve.

When the flange 44 on the spool valve engages the stem 82 to move it to the left, the slot 80 receives the ball 86 of the stem. Moreover, in accordance with the invention, a decrease in the pressure in the accumulator 54 below the inlet port pressure causes the charging valve to open the inlet port to the accumulator 54 and to the pressure chamber 34 when the flange is engaged with the stem 82. This is possible because the slot 80 is axially dimensioned to receive the stem 82 and the ball 86 when the charging valve 60 is in abutment with the check valve 62, as illustrated in FIG. 3. Therefore, the charging valve 60 moves axially in bore 50 independently of the position of the stem 82. Consequently, if the spool valve 30 is wedged against the bore 26 and the accumulator 54 is emptied of its pressurized fluid, the charging valve is responsive to the inlet port pressure to move away from sealing ring 94 to communicate the pressurized fluid from the inlet port to the pressure chamber via the clearance between shell 78 and bore 50, the slot 80 and the open passage 84.

In addition, the slot 80 exposes the accumulator 54 to the pressure relief valve 69 regardless of the axial position of the charging valve 60 within the bore 50. This prevents excessive buildup and storage of pressurized fluid within accumulator 54.

We claim:

1. In a hydraulic brake booster having a housing defining a pressure chamber, an accumulator, and an inlet port, valve means communicating the inlet port with the pressure chamber and the accumulator, and operator actuating means cooperating with the valve means to communicate the accumulator with the pressure chamber, the improvement wherein said valve means comprises a charging valve means and a check valve means, said housing including a bore extending between the inlet port and the pressure chamber and communicating with the accumulator, said bore receiving said check valve means and said charging valve means, said check valve means comprising a sleeve sealingly engaging the housing bore and an insert, said insert having a passage therethrough communicating the pressure chamber with the accumulator and supporting a stem which normally closes the insert passage and cooperates with the operator actuating means to open the passage, said charging valve means comprising a shell which forms a radial clearance with the housing bore to communicate the inlet port with the accumulator and a plug which is fixedly engaged with the shell, said shell cooperating with said plug to enclose a relief valve which is biased into engagement with said plug, said plug being moveable with said shell to engage said sleeve and having a slot to receive said stem when said plug is engaging said sleeve, and said plug slot providing for communication between the inlet port and the pressure chamber when said plug is engaging said sleeve and said stem extends into said plug slot.

* * * * *